United States Patent
Goto et al.

(10) Patent No.: US 10,101,514 B2
(45) Date of Patent: Oct. 16, 2018

(54) LAMINATE, STRETCHED LAMINATE, MANUFACTURING METHOD OF STRETCHED LAMINATE, MANUFACTURING METHOD OF OPTICAL FILM LAMINATE HAVING POLARIZING FILM USING THE SAME, AND POLARIZING FILM

(71) Applicant: NITTO DENKO CORPORATION, Ibaraki-shi, Osaka (JP)

(72) Inventors: Shusaku Goto, Ibaraki (JP); Minoru Miyatake, Ibaraki (JP); Takashi Kamijo, Ibaraki (JP); Satoru Kunikata, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/263,293

(22) Filed: Sep. 12, 2016

(65) Prior Publication Data
US 2016/0377772 A1    Dec. 29, 2016

Related U.S. Application Data

(63) Continuation-in-part of application No. PCT/JP2015/057753, filed on Mar. 16, 2015.

(30) Foreign Application Priority Data

Mar. 14, 2014   (JP) .................................. 2014-052486

(51) Int. Cl.
*G02B 5/30*    (2006.01)
*B29C 55/02*    (2006.01)

(52) U.S. Cl.
CPC .............. *G02B 5/305* (2013.01); *B29C 55/02* (2013.01); *G02B 5/30* (2013.01); *G02B 5/3025* (2013.01); *G02B 5/3033* (2013.01); *G02B 5/3041* (2013.01)

(58) Field of Classification Search
CPC .... G02B 5/305; G02B 5/3041; G02B 5/3033; G02B 5/3025; G02B 5/30; B29C 55/02; B29C 55/00
(Continued)

(56) References Cited

U.S. PATENT DOCUMENTS 2,263,249 A    11/1941 Rogers
5,213,582 A *  5/1993 Wild ........................ C08K 5/42
                                                544/14
(Continued)

FOREIGN PATENT DOCUMENTS

CN    102933677 A    2/2013
JP    51-69644 A    12/1974
(Continued)

OTHER PUBLICATIONS

Japanese Office Action dated Sep. 11, 2017 corresponding to Japanese Application No. 2016-507863, citing the above reference(s).

(Continued)

*Primary Examiner* — William R Alexander
(74) *Attorney, Agent, or Firm* — Hauptman Ham, LLP (57) ABSTRACT

Provided is a laminate comprising a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material, the post-process being performed after the (Continued)

polyvinyl alcohol based resin layer formed on the thermoplastic resin substrate is stretched together with the thermoplastic resin substrate, wherein the polyvinyl alcohol based resin layer comprises a polyvinyl alcohol based resin and a halide.

44 Claims, 1 Drawing Sheet

(58) Field of Classification Search
USPC .................................................. 359/487.02
See application file for complete search history.

(56) References Cited

U.S. PATENT DOCUMENTS

| | | | | |
|---|---|---|---|---|
| 8,323,538 | B2* | 12/2012 | Ogomi | G02B 5/3033 264/1.31 |
| 8,709,567 | B2 | 4/2014 | Kitagawa et al. | |
| 9,442,235 | B2 | 9/2016 | Kitagawa et al. | |
| 9,459,390 | B2 | 10/2016 | Kitagawa et al. | |
| 2003/0137732 | A1* | 7/2003 | Sugino | B29C 55/04 359/487.01 |
| 2006/0007371 | A1* | 1/2006 | Miyatake | G02B 5/30 349/96 |
| 2007/0035681 | A1 | 2/2007 | Okada et al. | |
| 2009/0051058 | A1* | 2/2009 | Ogomi | G02B 5/3033 264/1.34 |
| 2009/0185271 | A1* | 7/2009 | Yaegashi | B29D 11/0073 359/489.2 |
| 2010/0182689 | A1* | 7/2010 | Nakanishi | C08G 18/0823 359/485.01 |
| 2011/0315306 | A1 | 12/2011 | Goto et al. | |
| 2012/0052197 | A1 | 3/2012 | Sawada et al. | |
| 2012/0055621 | A1 | 3/2012 | Goto et al. | |
| 2012/0056211 | A1 | 3/2012 | Kitagawa et al. | |
| 2012/0056340 | A1 | 3/2012 | Kitagawa et al. | |
| 2012/0058291 | A1* | 3/2012 | Kitagawa | G02B 5/3033 428/43 |
| 2013/0052457 | A1* | 2/2013 | Inui | C08F 265/06 428/336 |
| 2013/0288048 | A1* | 10/2013 | Toyama | C09J 133/066 428/337 |
| 2013/0329289 | A1 | 12/2013 | Haida et al. | |
| 2014/0186568 | A1 | 7/2014 | Kitagawa et al. | |
| 2014/0375945 | A1* | 12/2014 | Tokumaru | G02C 7/12 351/49 |
| 2015/0146140 | A1* | 5/2015 | Saneto | G02B 1/14 349/96 |
| 2016/0054494 | A1 | 2/2016 | Kitagawa et al. | |
| 2016/0185993 | A1* | 6/2016 | Yoshida | C09D 101/12 428/1.31 |

FOREIGN PATENT DOCUMENTS

| | | |
|---|---|---|
| JP | 1-223404 A | 8/1992 |
| JP | 6-281816 A | 10/1994 |
| JP | 6-289224 A | 10/1994 |
| JP | 7-104126 A | 4/1995 |
| JP | 7-104216 A | 4/1995 |
| JP | 2000338329 A | 12/2000 |
| JP | 2001343521 A | 12/2001 |
| JP | 2003-240952 A | 8/2003 |
| JP | 2005-283758 A | 10/2005 |
| JP | 2007-17845 A | 1/2007 |
| JP | 2011-2816 A | 1/2011 |
| JP | 2012-73563 A | 4/2012 |
| JP | 2012-73574 A | 4/2012 |
| JP | 2012-73575 A | 4/2012 |
| JP | 2012-134117 A | 7/2012 |
| JP | 2013-254067 A | 12/2013 |
| TW | 201222025 A | 6/2012 |
| TW | 201235219 A | 9/2012 |
| WO | 01/68746 A1 | 9/2001 |
| WO | 2005/029143 A1 | 3/2005 |
| WO | 2010/100917 A1 | 9/2010 |

OTHER PUBLICATIONS

Korean Office Action dated Jul. 11, 2017 for Korean Patent Application No. 10-2016-7027239, citing the above reference(s).
Japanese Office Action dated Dec. 26, 2016 for Japanese Application No. 2016-507863, citing the above reference(s).
Taiwanese Office Action dated Oct. 5, 2015 corresponding to Taiwanese Application No. 103144317, citing the above reference(s).
International Search Report dated Apr. 14, 2015 corresponding to International Application No. PCT/JP2015/057753, citing the above reference(s).
The Chinese Office Action dated Feb. 5, 2018 for corresponding Chinese Patent Application No. 201580013711.5, citing the above references.

* cited by examiner

FIG.1

FIG.2

LAMINATE, STRETCHED LAMINATE, MANUFACTURING METHOD OF STRETCHED LAMINATE, MANUFACTURING METHOD OF OPTICAL FILM LAMINATE HAVING POLARIZING FILM USING THE SAME, AND POLARIZING FILM

CROSS REFERENCE TO RELATED APPLICATIONS

The present application is a Continuation-In-Part (CIP) of International Application No. PCT/JP2015/057753, filed Mar. 16, 2015, which is based upon and claims the benefit of priority to Japanese Patent Application No. 2014-052486, filed Mar. 14, 2014. The disclosures of the above-listed applications are hereby incorporated by reference herein in their entirety.

TECHNICAL FIELD

The present invention relates to a laminate, a stretched laminate, a manufacturing method of stretched laminates, manufacturing method of optical film laminates having a polarizing film using the same, and a polarizing film. In particular, the present invention relates to a stretched laminate comprising a thermoplastic resin substrate and a polyvinyl alcohol based resin layer including a polyvinyl alcohol based resin and a halide formed on the thermoplastic resin substrate, a stretched laminate, a manufacturing method of stretched laminates, manufacturing method of optical film laminates having a polarizing film using the same, and a polarizing film.

BACKGROUND ART

A polarizing film of polyvinyl alcohol based resin with oriented iodine is presently used for many optical display devices such as a television set, a cellular phone, a portable information terminal. In recent years, the polarizing film is increasingly required to be further thinned in the market. Although it is difficult to make a thinned polarizing film having excellent optical properties, the level required for the optical properties has been increasingly raised.

Examples of the manufacturing method of a polarizing film include a manufacturing method comprising a step of stretching a polyvinyl alcohol based resin layer and a resin substrate for stretching in a laminate state, and a step of dyeing. According to the manufacturing method, even a thin polyvinyl alcohol based resin layer can be stretched without problems such as fracture in stretching, due to the support by the resin substrate for stretching.

Examples of the manufacturing method comprising a step of stretching in a laminate state and a step of dyeing include a method of stretching in the air (dry stretching) as described in Japanese Patent Laid-Open No. 51-069644, Japanese Patent Laid-Open No. 2000-338329 and Japanese Patent Laid-Open No. 2001-343521. With respect to the capability of manufacturing a thin polarizing film excellent in optical properties, stretchable with a high stretch ratio, a manufacturing method comprising the step of stretching in a boric acid aqueous solution as described in International Publication No. WO 2010/100917, Japanese Patent Laid-Open No. 2012-073563 and Japanese Patent Laid-Open No. 2012-134117 is advantageous, and, in particular, a manufacturing method (two-stage stretching method) comprising a step of auxiliary stretching in the air prior to stretching in a boric acid aqueous solution as described in Japanese Patent Laid-Open No. 2012-073563 and Japanese Patent Laid-Open No. 2012-134117 is advantageous. In addition, a manufacturing method (excessive dyeing and partial decolorization method) comprising stretching a PVA based resin layer and a resin substrate for stretching in a laminate state, then excessively dyeing the PVA based resin layer, and then partially decolorizing the excessively-dyed PVA based resin layer as described in Japanese Patent Laid-Open No. 2011-2816 is also advantageous.

CITATION LIST

Patent Literature

Patent Literature 1: Japanese Patent Laid-Open No. 51-069644
Patent Literature 2: Japanese Patent Laid-Open No. 2000-338329
Patent Literature 3: Japanese Patent Laid-Open No. 2001-343521
Patent Literature 4: International Publication No. WO 2010/100917
Patent Literature 5: Japanese Patent Laid-Open No. 2012-073563
Patent Literature 6: Japanese Patent Laid-Open No. 2012-134117
Patent Literature 7: Japanese Patent Laid-Open No. 2011-2816

SUMMARY OF INVENTION

Technical Problem

As described above, the level required for the optical properties of a thin polarizing film has been increasingly raised. The present inventors found that a polarizing film having excellent optical properties can be manufactured by stretching a laminate in which a halide is contained in a polyvinyl alcohol based resin layer laminated on a thermoplastic resin substrate to obtain a stretched laminate and then dyeing the stretched laminate.

An object of the present invention is to provide an intermediate material and a manufacturing method of a polarizing film excellent in optical properties.

Solution to Problem

In an embodiment of the present invention, provided is a laminate comprising a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material, the post-process being performed after the polyvinyl alcohol based resin layer formed on the thermoplastic resin substrate is stretched together with the thermoplastic resin substrate, wherein the polyvinyl alcohol based resin layer comprises a polyvinyl alcohol based resin and a halide.

The post-process may further comprise a final stretching step of stretching the polyvinyl alcohol based resin layer.

The polyvinyl alcohol resin layer formed on the thermoplastic resin substrate prior to stretching may be obtained by applying a polyvinyl alcohol based resin coating liquid containing the halide to the thermoplastic resin substrate and then drying at 80° C. or lower.

In an embodiment of the present invention, provided is a stretched laminate comprising a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material, wherein the polyvinyl alcohol based resin layer comprises a polyvinyl alcohol based resin and a halide, and the polyvinyl alcohol based resin layer formed on the thermoplastic resin substrate is stretched together with the thermoplastic resin substrate.

The post-process may further comprise a final stretching step of stretching the polyvinyl alcohol based resin layer.

The polyvinyl alcohol resin layer formed on the thermoplastic resin substrate prior to stretching may be obtained by applying a polyvinyl alcohol based resin coating liquid containing the halide to the thermoplastic resin substrate and then drying at 80° C. or lower.

The polyvinyl alcohol resin based layer formed on the thermoplastic resin substrate may be stretched in the air together with the thermoplastic resin substrate.

The stretch ratio in the stretching in the air may be 1.5 or more and 3.5 or less.

The stretching temperature in the stretching in the air may be 100° C. or higher and 150° C. or lower.

The post-process may comprise at least a dyeing step of dyeing the polyvinyl alcohol based resin layer with a dichroic material to form a colored laminate and an in-boric acid water stretching step of stretching the colored laminate in a boric acid aqueous solution.

In an embodiment of the present invention, provided is a roll of stretched laminate formed by winding the stretched laminate in a roll form.

In an embodiment of the present invention, provided is a manufacturing method of a stretched laminate including a thermoplastic resin substrate and a polyvinyl alcohol based resin layer formed on the thermoplastic resin substrate, being used to form a polarizing film of the polyvinyl alcohol based resin layer treated with a post-process including at least a dyeing step of dyeing the polyvinyl alcohol based resin layer with a dichroic material, comprises the steps of applying a polyvinyl alcohol based resin coating liquid containing a halide to a thermoplastic resin substrate so as to form a laminate including the thermoplastic resin substrate and a polyvinyl alcohol based resin layer containing a polyvinyl alcohol based resin and a halide, formed on the thermoplastic resin substrate, and stretching the laminate to form a stretched laminate.

The post-process may further include a final stretching step of stretching the polyvinyl alcohol based resin layer.

The step of forming the laminate may further comprise a step of drying at 80° C. or lower, after application of the polyvinyl alcohol based resin coating liquid containing a halide.

The laminate may be stretched in the air.

The stretch ratio in the stretching in the air may be 1.5 or more and 3.5 or less.

The stretching temperature in the stretching in the air may be 100° C. or higher and 150° C. or lower.

In an embodiment of the present invention, provided is a manufacturing method of a roll of stretched laminate comprising winding, in a roll form, a stretched laminate manufactured by the manufacturing method of a stretched laminate so as to form a roll of stretched laminate.

In an embodiment of the present invention, provided is a manufacturing method of an optical film laminate comprising: a step of stretching a laminate including a thermoplastic resin substrate and a polyvinyl alcohol based resin layer containing a polyvinyl alcohol based resin and a halide, formed on the thermoplastic resin substrate, so as to form a stretched laminate including the thermoplastic resin substrate and the stretched polyvinyl alcohol based resin layer; and a post-process including at least a dyeing step of dyeing the polyvinyl alcohol based resin layer with a dichroic material; the optical film laminate including a polarizing film formed of the polyvinyl alcohol based resin layer treated with the post-process and the thermoplastic resin substrate.

The post-process may further include a final stretching step of stretching the polyvinyl alcohol based resin layer.

The polyvinyl alcohol resin layer formed on the thermoplastic resin substrate prior to stretching may be obtained by applying a polyvinyl alcohol based resin coating liquid containing the halide to the thermoplastic resin substrate and then drying at 80° C. or lower.

The laminate may be stretched in the air.

The stretch ratio in the stretching in the air may be 1.5 or more and 3.5 or less.

The stretching temperature in the stretching in the air may be 100° C. or higher and 150° C. or lower.

The post-process may include at least a dyeing step of dyeing the polyvinyl alcohol based resin layer with a dichroic material to form a colored laminate and an in-boric acid water stretching step of stretching the colored laminate in a boric acid aqueous solution.

In an embodiment of the present invention, provided is a polarizing film manufactured by the manufacturing method of an optical film laminate.

The molar ratio of the halide to the polyvinyl alcohol based resin may be 1.0 or more and 5.3 or less.

The halide may be an iodide.

The iodide may be potassium iodide.

The halide may be sodium chloride.

The polarizing film may have a thickness of 10 μm or less.

The polarizing film may have a thickness of 7 μm or less.

The polarizing film may have a thickness of 5 μm or less.

Advantageous Effects of Invention

According to the present invention, a laminate in which a halide is contained in a polyvinyl alcohol based resin layer on a thermoplastic resin substrate is stretched to obtain a stretched laminate, and the stretched laminate is then dyed to manufacture a polarizing film excellent in optical properties.

The laminate of the present invention, the stretched laminate, the manufacturing method of a stretched laminate, the manufacturing method of an optical film laminate including a polarizing film using the same, and embodiments of the polarizing film are described in detail as follows with reference to drawings.

DESCRIPTION OF EMBODIMENTS

[Laminate]

The laminate of the present invention comprises a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material and a final stretching step of stretching the polyvinyl alcohol based resin layer, the post-process being performed after the polyvinyl alcohol based resin layer formed on the thermoplastic resin substrate is stretched together with the thermoplastic resin substrate.

[Stretched Laminate]

The stretched laminate of the present invention comprises a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material and a final stretching step of stretching the colored polyvinyl alcohol based resin layer. The polyvinyl alcohol based resin layer formed on the thermoplastic resin substrate is stretched together with the thermoplastic resin substrate. The stretching may be performed in the air (dry stretching).

[Roll of Stretched Laminate]

The roll (material roll) of the stretched laminate of the present invention is formed by winding the stretched laminate with a winding apparatus.

[Manufacturing Method of Optical Film Laminate]

The manufacturing method of an optical film laminate of the present invention comprises a step of stretching a laminate including a thermoplastic resin substrate and a polyvinyl alcohol based resin layer containing a polyvinyl alcohol based resin and a halide, formed on the thermoplastic resin substrate, so as to form a stretched laminate including the thermoplastic resin substrate and the stretched polyvinyl alcohol based resin layer, and post-process including at least a dyeing step of dyeing the polyvinyl alcohol based resin layer with a dichroic material and a final stretching step of stretching the dyed polyvinyl alcohol based resin layer, the optical film laminate including a polarizing film formed of the polyvinyl alcohol based resin layer treated with the post-process and the thermoplastic resin substrate.

The manufacturing method of an optical film laminate of the present invention may be applied to various stretching methods, and, in particular, advantageously applied to a two-stage stretching method including an in-air auxiliary stretching step and an in-boric acid water stretching step. In that case, the in-air auxiliary stretching step is performed as the in-air stretching step, and the in-boric acid water stretching step is performed as the final stretching step.

[Stretching in the Air]

The stretching in the air of the present invention is a so-called dry stretching which is performed in a gas. The gas is typically air, and may be an inert gas such as nitrogen. The method for stretching is not particularly limited, and a typical stretching process for stretching a film such as roll stretching and tenter stretching may be employed. The stretching may include stretching in one direction (uniaxial stretching) such as in the longitudinal direction or the transverse direction, biaxial stretching and oblique stretching. The stretch ratio in the stretching in the air is preferably 1.5 or more and 3.5 or less, more preferably 1.8 or more and 3.0 or less. The stretching temperature in the stretching in the air is preferably 100° C. or higher and 150° C. or lower.

The in-air stretching step of the present invention may be the in-air auxiliary stretching step as the first step in a two-stage stretching method.

[Post-Process]

The post-process of the present invention includes at least a dyeing step of dyeing the polyvinyl alcohol based resin layer with a dichroic material. An optical film laminate including a polarizing film formed of the polyvinyl alcohol based resin layer treated with the post-process and a thermoplastic resin substrate is thus formed.

The post-process may further include a final stretching step of stretching the polyvinyl alcohol based resin layer.

The post-process may include at least a dyeing step of dyeing the polyvinyl alcohol based resin layer with a dichroic material to form a colored laminate and an in-boric acid water stretching step of stretching the colored laminate in the boric acid aqueous solution.

[Dyeing Step]

The dyeing step of the present invention includes a step of dyeing the polyvinyl alcohol based resin layer with a dichroic material to form a colored laminate.

The dyeing step is performed after the step of forming a stretched laminate. The dyeing step may be performed in succession after the step of forming a stretched laminate. Alternatively, a separate step may be performed as desired between the step of forming a stretched laminate and the dyeing step.

Examples of the dichroic material for use in the present invention include iodine and organic dyes (e.g. polymethine coloring matter, cyanine coloring matter, merocyanine coloring matter, rodacyanine coloring matter, tri-nucleus merocyanine coloring matter, allopolar coloring matter, hemicyanine coloring matter, styryl coloring matter, and azo coloring matter). In particular, iodine is preferred from the viewpoint of having excellent optical properties.

The dyeing of a stretched laminate with a dichroic material may be performed by, for example, contacting the stretched laminate with a dyeing liquid which contains the dichroic material.

The method for contacting the stretched laminate with the dyeing liquid is not particularly limited, and examples thereof include a method for immersing the stretched laminate in a dyeing bath containing the dyeing liquid, and a method for spraying the dyeing liquid onto the stretched laminate. These methods may be used in combination.

In particular, the method for immersing the stretched laminate in a dyeing bath containing a dyeing liquid is preferred.

The method for immersing a stretched laminate in a dyeing bath containing a dyeing liquid including iodine as the dichroic material is described in detail as follows. Alternatively, a known excessive dyeing and partial decolorization method as described above may be employed instead of the method described below.

An aqueous solvent is preferred as the solvent for the dyeing liquid. Examples of the aqueous solvent include water and a mixed solvent of water and a small amount of water-soluble organic solvent. In particular, water is preferred.

The iodine concentration in the dyeing liquid is not particularly limited as long as the dyeing can be made, and is typically 0.5 parts by mass to 10 parts by mass relative to 100 parts by mass of the solvent (e.g. water). The iodine concentration means the blending ratio of iodine relative to the total amount of the solution. For example, the amount of iodine added as an iodide such as potassium iodide is excluded. In the present specification described below, the term "iodine concentration" is used with the same meaning.

In order to enhance the solubility of iodine, the dyeing liquid preferably contains an iodide. Examples of the iodide include potassium iodide, lithium iodide, sodium iodide, zinc iodide, aluminum iodide, lead iodide, copper iodide, barium iodide, calcium iodide, tin iodide, and titanium iodide. One of these may be used alone, or a plurality of these may be used in combination.

In particular, potassium iodide is preferred.

The iodide content in a dyeing liquid is preferably 3 parts by mass to 50 parts by mass relative to 100 parts by mass of the solvent (e.g. water).

An aqueous solution containing iodine and potassium iodide is particularly preferred as the dyeing liquid. The iodine content in the particularly preferred dyeing liquid is preferably 0.5 parts by weight to 10 parts by weight relative to 100 parts by weight of water, and the potassium iodide content is preferably 3 parts by weight to 50 parts by weight relative to 100 parts by weight of water.

The temperature of the dyeing liquid during immersion and the immersion time are appropriately determined depending on the concentration of the dyeing liquid, the thickness of the polyvinyl alcohol based resin layer, and the like, such that the dyeing is properly performed. The temperature of the dyeing liquid is typically 10° C. to 60° C., and the immersion time is typically 10 seconds to 20 minutes.

[In-Boric Acid Water Stretching Step]

The in-boric acid water stretching step of the present invention is a step of stretching a dyed stretched laminate (colored laminate) immersed in a boric acid aqueous solution at least in the longitudinal direction. The in-boric acid water stretching step may be a step of second-stage stretching in a two-stage stretching method. The in-boric acid water stretching step allows the polyvinyl alcohol based resin layer included in a colored laminate to change into a vinyl alcohol based resin layer with adsorbed polyiodine ions oriented. The polyvinyl alcohol based resin layer with adsorbed polyiodine ions oriented constitutes the polarizing film of an optical film laminate.

The boric acid concentration in a boric acid aqueous solution is preferably 2 parts by mass to 8 parts by mass relative to 100 parts by mass of water. The method for stretching is not particularly limited, and a stretching process typically used in film stretching such as roll stretching and tenter stretching may be employed. The stretching may include stretching in one direction (uniaxial stretching) such as in the longitudinal direction or the width direction, biaxial stretching and oblique stretching. The stretch ratio in the stretching in boric acid water may be determined to have a total stretch ratio in stretching in the air and stretching in boric acid water of 4 or more and 7 or less. The stretching temperature in the stretching in boric acid water is preferably 50° C. or higher and 80° C. or lower.

[Optional Step]

Examples of the steps to be performed as desired include a first insolubilizing step, a cross-linking step, a second insolubilizing step, a cleaning step, a water drop removal step, and a drying step, which are described one by one as follows.

(First Insolubilizing Step)

The first insolubilizing step is a step of immersing a stretched laminate in a boric acid aqueous solution prior to a dyeing step, preventing the stretched polyvinyl alcohol based resin layer included in a stretched laminate from dissolving at least in the dyeing step in the post-process. The concentration, the liquid temperature, and the immersion time of the boric acid aqueous solution are preferably 1 part by mass to 5 parts by mass relative to 100 parts by mass of water, 10° C. or higher and 50° C. or lower, and 1 second or more and 300 seconds or less, respectively.

(Cross-Linking Step)

A cross-linking step for cross-linking polyvinyl alcohol molecules contained in the stretched vinyl alcohol based resin layer to each other may be performed preferably after the dyeing process on an as needed basis, with the following main purposes: (1) to prevent the stretched polyvinyl alcohol based resin layer included in a colored laminate from dissolving during the post-process stretching in a boric acid water; (2) to prevent the colored iodine in the stretched polyvinyl alcohol based resin layer from eluting; and (3) to cross-link molecules of the stretched polyvinyl alcohol based resin layer to each other so as to form nodal points.

The cross-linking may be performed by, for example, contacting a stretched polyvinyl alcohol based resin layer with a cross-linking agent-containing cross-linking liquid.

The method for contacting a stretched polyvinyl alcohol based resin layer with a cross-linking liquid is not particularly limited, and examples of the method include a method of immersing the stretched polyvinyl alcohol based resin layer in a cross-linking bath containing a cross-linking liquid, and a method of spraying or applying a cross-linking liquid to the stretched polyvinyl alcohol based resin layer. These methods may be used in combination.

In particular, a method of immersing the stretched polyvinyl alcohol based resin layer in a cross-linking bath containing a cross-linking liquid is preferred.

Examples of the cross-linking agent include a boron compound. Examples of the boron compound include boric acid, borax, glyoxal, and glutaraldehyde. One of these may be used alone, or a plurality thereof may be used in combination.

An aqueous solvent is preferred as the solvent of the cross-linking liquid. Examples of the aqueous solvent include water and a mixed solvent of water and a small amount of water-soluble organic solvent. In particular, water is preferred.

The cross-linking agent concentration in the cross-linking liquid is 0.1 parts by mass to 10 parts by mass relative to 100 parts by mass of solvent (e.g. water), though not particularly limited as long as cross-linking can be made.

The cross-linking liquid preferably contains an iodide from the viewpoint of obtaining uniform properties in the plane of a polarizer. Examples of the iodide include the same ones exemplified in the dyeing step described above. The amount of iodide in a cross-linking liquid is typically 0.5 parts by mass to 15 parts by mass relative to 100 parts by mass of solvent (e.g. water).

The temperature of the cross-linking liquid during immersion is typically 20° C. to 70° C. and the immersion time is typically 1 second to 300 seconds, though not particularly limited.

(Second Insolubilizing Step)

The second insolubilizing step is a step of immersing a colored laminate in boric acid aqueous solution prior to the in-boric acid water stretching step and after the cross-linking step, which prevents the stretched polyvinyl alcohol based resin layer included in a colored laminate from dissolving at least in the in-boric acid water stretching step in the post-process. The concentration, the liquid temperature, and the immersion time of the boric acid aqueous solution are preferably 1 part by mass to 6 parts by mass relative to 100 parts by mass of water, 10° C. or higher and 60° C. or lower, and 1 second or more and 300 seconds or less, respectively.

(Cleaning Step)

The cleaning step is a step of washing away unnecessary residues attached to the surface of the polarizing film included in an optical film laminate taken out from the boric acid aqueous solution in the in-boric acid water stretching step, and may be performed on an as needed basis.

(Water Drop Removal Step)

The water drop removal step is a step of removing excessive water drops attached to the surface of the stretched polyvinyl alcohol based resin layer, and may be performed on an as needed basis.

The water drop removal step is performed preferably after one or more steps selected from the group consisting of, for example, a dyeing step, a cross-linking step, and a cleaning step.

The removal of water drops may be performed by using, for example, a pinch roll or an air knife.

(Drying Step)

The drying step is a step of drying an optical film laminate so as to adjust the water content ratio of a polarizing film included in the optical film laminate, and may be performed on an as needed basis.

The drying step is performed preferably at the end of the consecutive steps described above.

The drying may be performed by a known method such as air drying or heat drying.

Drying conditions such as the drying time and the drying temperature in heat drying may be determined depending on the desired water content ratio. For example, the upper limit of the heating temperature in heat drying is typically about 80° C. From the viewpoint of preventing the deterioration of a polarizing film, a relatively low heating temperature is preferred. The drying time in heat drying is typically about 1 minute to about 10 minutes.

In air drying, an optical film laminate may be exposed to dry air in order to accelerate the drying.

[Thermoplastic Resin Substrate]

Any appropriate thermoplastic resin may be used for the thermoplastic resin substrate of the present invention. Examples of the thermoplastic resin include an ester based resin such as a polyethylene terephthalate based resin, a cycloolefin based resin such as a norbornene based resin, an olefin based resin such as polypropylene, a polyamide based resin, a polycarbonate based resin, and a copolymer resin thereof. In particular, a norbornene based resin, and an amorphous (non-crystallized) polyethylene terephthalate based resin are preferred.

Among the amorphous (non-crystallized) polyethylene terephthalate based resins, an amorphous (hardly crystallized) polyethylene terephthalate based resin is particularly preferably used. Specific examples of the amorphous polyethylene terephthalate based resin include a copolymer which further contains isophthalic acid as dicarboxylic acid and a copolymer which further contains cyclohexanedimethanol as glycol.

The thermoplastic resin substrate may be a single layer body or a multi-layer laminate of a single polymerizable material or a plurality of polymerizable materials, as long as the substrate can be stretched integrally with a PVA based resin layer in a stretching step. The polymerizable material may be a homopolymer, a copolymer, or a blended polymer. A component of inorganic material and/or organic material may be added to the polymerizable material. The substrate for use may have optical properties such as reflection, light scattering and color hue adjustment, and an anti-static function, an anti-blocking function, or the like. In order to further enhance the adhesion between the substrate and a PVA based resin, an easy adhesive layer may be applied to the substrate, or a material to aid the adhesion may be added into the polymerizable material.

As a substrate having optical properties such as reflection, light scattering and color hue adjustment, and an anti-static function, an anti-blocking function, or the like, a laminate of two or more transparent resin layers may be used. Such a laminate may for example comprise a transparent resin base layer and a second transparent layer laminated to the base layer, the second layer being of a material having a refractive index n1 which is lower than that of the material of the base layer. In this case, the second layer may have an initial thickness which is determined such that the thickness d after stretching will have a value satisfying the relationship $d=(1/4)\times(\lambda/n1)$ which represents a condition for allowing the second layers function as an anti-reflection film, where $\lambda$ represents a wavelength of light which may preferably be 550 nm for the purpose of preventing reflection. The second layer functions after stretching as an anti-reflection film so that even when polyester film having a refractive index n1 of 1.58 is used as the base layer, it is possible to suppress a surface reflection to an extent equivalent to a case of tri-acetyl-cellulose which has a refractive index of 1.49 and has commonly been used as a protective film for a polarizer. Thus, by using such a laminate, it is possible to suppress a decrease in transmission rate.

Alternatively, a transparent resin film may be provided by a transparent base resin layer having a plurality of domains of a different transparent resin material dispersed in the base resin layer in such a manner that the resin film possesses at least one of the aforementioned optical properties when the base resin layer and the domains of the different transparent resin material have been stretched according to the process described herein. Such a film may comprise a transparent base resin layer and a plurality of dispersed domain resin material which has refractive index after stretching coinciding with that of the base resin layer after stretching in a direction transverse to the direction of stretching. Such a film can be effective to enhance the polarization degree in a manner described in the U.S. Patent Application Publication 2001/0004299 A1. Alternatively, a film shown in JP H9-274108 may also be used as the thermoplastic resin substrate. Such a film shows an anisotropic scattering polarization property when stretched with the PVA-based resin layer. Another example is the one shown and described in the U.S. Pat. No. 5,825,543 issued on Oct. 20, 1998 to A. J. Ouderkirk et. al.

In the method of stretching in boric acid water as described above, the thermoplastic resin substrate absorbs water so as to be plasticized with the water functioning as plasticizer. As a result, the stretching stress is drastically reduced, so that the stretching with a high stretch ratio can be achieved. The better stretchability can be obtained in comparison with stretching in the air. Consequently a polarizing film excellent in optical properties can be manufactured. The water absorption of the thermoplastic resin substrate is preferably 0.2% or more and more preferably 0.3% or more. The water absorption of the thermoplastic resin substrate is preferably 3.0% or less and more preferably 1.0% or less. Use of such a thermoplastic resin substrate prevents problems such as deterioration in the appearance of a produced polarizing film caused by drastic reduction in the dimensional stability during manufacturing. In addition, the fracture of the substrate during stretching in boric acid water and the detachment of the polyvinyl alcohol based resin layer from the thermoplastic resin substrate can be prevented. The water absorption of the thermoplastic resin substrate can be adjusted by, for example, introducing a modified group into a constituent material. The water absorption means the value obtained in accordance with JIS K 7209.

The glass transition temperature (Tg) of the thermoplastic resin substrate is preferably 170° C. or lower. Use of such a thermoplastic resin substrate allows a laminate to have sufficient stretchability while preventing the crystallization of the polyvinyl alcohol based resin layer. In addition, the glass transition temperature is preferably 120° C. or lower, in order to favorably perform the plasticization of the thermoplastic resin substrate with water and the stretching in boric acid water. The glass transition temperature of the resin substrate is preferably 60° C. or higher. Use of such a thermoplastic resin substrate prevents the problems such as deformation of the thermoplastic resin substrate (e.g. occurrence of irregularities, slackening and wrinkles) when a polyvinyl alcohol based resin-containing coating liquid is applied and dried, so that a laminate can be favorably manufactured. In addition, the polyvinyl alcohol based resin layer can be favorably stretched at a suitable temperature (e.g. about 60° C.). The glass transition temperature may be lower than 60° C., as long as the thermoplastic resin substrate is not deformed when a polyvinyl alcohol based resin-containing coating liquid is applied and dried. The glass transition temperature of a thermoplastic resin substrate may be adjusted by, for example, introducing a modified group into a constituent material, or heating with use of a crystallizable material. The glass transition temperature (Tg) means a value obtained in accordance with JIS K 7121.

The thickness of the thermoplastic resin substrate prior to stretching is preferably 20 μm to 300 μm, more preferably 50 μm to 200 μm. With a thickness of less than 20 μm, the formation of a polyvinyl alcohol based resin layer is likely to be difficult. With a thickness of more than 300 μm, for example, in the stretching in boric acid water, it is likely that a long time is required for the thermoplastic resin substrate to absorb water and an excessive load is required in stretching.

[Polyvinyl Alcohol Based Resin Layer]

The polyvinyl alcohol based resin layer included in a laminate of the present invention or the stretched polyvinyl alcohol based resin layer included in a stretched laminate comprises a polyvinyl alcohol based resin and a halide.

Any appropriate resin may be employed as the polyvinyl alcohol based resin. Examples the resin include polyvinyl alcohol, and an ethylene-vinyl alcohol copolymer. The polyvinyl alcohol is obtained by the saponification of polyvinyl acetate. The ethylene-vinyl alcohol copolymer is obtained by the saponification of an ethylene-vinyl acetate copolymer. The polyvinyl alcohol based resin has a saponification degree of, typically 85 mol % to 100 mol %, preferably 95.0 mol % to 99.95 mol %, more preferably 99.0 mol % to 99.93 mol %. The saponification degree may be obtained in accordance with JIS K 6726-1994. A polarizing film excellent in durability can be obtained with use of the polyvinyl alcohol based resin with such a saponification degree. With an excessively high saponification degree, gelation is likely to occur.

The polyvinyl alcohol based resin may partially contain a modified polyvinyl alcohol with a modified group in a side chain. Examples of the modified group of a modified polyvinyl alcohol include an acetoacetyl group, a carbonyl group, a carboxylic group, and an alkyl group. The modification degree of the modified polyvinyl alcohol is preferably 0.1 to 10 mol %, though not particularly limited. The amount of modified polyvinyl alcohol added is preferably 0.1 mol % to 30 mol %. Depending on the modified group of a modified polyvinyl alcohol, an excessively high modification degree or an excessively high amount added may cause problems such as reduction in water resistance. The modification degree and the amount added are therefore appropriately determined.

The average polymerization degree of a polyvinyl alcohol based resin may be appropriately selected according to the purpose. The average polymerization degree is typically 1000 to 10000, preferably 1200 to 5000, more preferably 1500 to 4500. The average polymerization degree may be obtained in accordance with JIS K 6726-1994.

The amount of a halide added to the polyvinyl alcohol based resin layer of a laminate, represented by the molar ratio of the halide to the polyvinyl alcohol based resin in a polyvinyl alcohol based resin layer, is preferably 1.0 or more and 5.3 or less, more preferably 2.0 or more and 5.0 or less. Since a stretched laminate is a laminate subjected to dry stretching only, the molar ratio of the halide to the polyvinyl alcohol based resin in a stretched polyvinyl alcohol based resin layer included in a stretched laminate is not changed from the molar ratio of the halide to the polyvinyl alcohol based resin in a polyvinyl alcohol based resin layer included in a laminate. Accordingly, the molar ratio of the halide to the polyvinyl alcohol based resin in a stretched polyvinyl alcohol based resin layer included in a stretched laminate is preferably 1.0 or more and 5.3 or less, more preferably 2.0 or more and 5.0 or less, in the same manner.

A polarizing film including a halide added to the polyvinyl alcohol based resin layer in an amount with a molar ratio of the halide to the polyvinyl alcohol based resin of 1.0 or more has more improved optical properties than those of a polarizing film without addition of a halide. As the amount of a halide added increases, the more improved optical properties can be obtained. When the amount of a halide added increases to have a molar ratio of the halide to the polyvinyl alcohol based resin contained in the polyvinyl alcohol based resin of more than 5.3, however, the halide bleeds out to opacify the film.

The halide may be an iodide or sodium chloride. Examples of the iodide may include potassium iodide, sodium iodide, and lithium iodide.

In general, stretching of a polyvinyl alcohol resin increases the orientation degree of polyvinyl alcohol molecules in the polyvinyl alcohol resin. When the stretched polyvinyl alcohol resin is immersed in a water-containing liquid, the orientation of polyvinyl alcohol molecules is disturbed. In other words, the orientation degree decreases. On the other hand, it is believed that the crystallization of the polyvinyl alcohol resin in a stretched laminate is accelerated by the addition of a halide described above. Accordingly, it is presumed that the addition of a halide having an effect of accelerating the crystallization of the polyvinyl alcohol resin suppresses the disturbance of the orientation of polyvinyl alcohol molecules, i.e. the reduction in orientation degree, when a stretched laminate is immersed in a liquid, in comparison with the case of no addition of a halide. This contributes the improvement in optical properties of a polarizing film resulting from the post-process including a dyeing step as a step of immersing in a liquid, a final stretching step including immersion in a liquid, and a step incidental to these steps (e.g. cross-linking step).

Prior to stretching, the polyvinyl alcohol resin layer formed on the thermoplastic resin substrate of the present invention can be obtained by applying a polyvinyl alcohol based resin coating liquid containing a halide to the thermoplastic resin substrate and drying the liquid. The drying temperature is not particularly limited, the upper limit of the drying temperature is 120° C., preferably 80° C., and the lower limit of the drying temperature is preferably 50° C. In particular, in the case of a final stretching step performed in boric acid water, the stretching in boric acid water is typically performed at 80° C. or lower. As a result, a polyvinyl alcohol resin is applied to a thermoplastic resin substrate having a glass transition temperature (Tg) of 80° C. or lower in many cases. In that case, the applied polyvinyl alcohol resin is typically dried at 80° C. or lower in order to avoid problems caused by deformation of the thermoplastic resin substrate. Accordingly, the drying temperature of polyvinyl alcohol in the drying step is relatively low, resulting in insufficient water resistance in many cases. In these cases, the addition of a halide having an effect of accelerating the crystallization of a polyvinyl alcohol resin enhances the water resistance of the polyvinyl alcohol resin in the stretching prior to the post-process, so that the contribution to the improvement in optical properties of a polarizing film obtained in the post-process containing a final stretching step can be achieved. In contrast, a polyvinyl alcohol resin mono-layer film, which is not a laminate, the effect of Tg of the substrate is not required to be taken into account, so that any drying temperature may be selected. In other words, the drying can be performed at a higher temperature, so that the polyvinyl alcohol resin can be expected to have a sufficient water resistance. Accordingly, such a treatment is not required.

[Polarizing Film]

As described above, the polarizing film of the present invention comprises a polyvinyl alcohol based resin layer with an oriented dichroic material which is included in an optical film laminate obtained by the manufacturing method of the present invention. In other words, the polarizing film is manufactured by stretching a polyvinyl alcohol based resin film impregnated with a dichroic material to be adsorbed in a dyeing step, such that the impregnating dichroic material is oriented.

When a polyvinyl alcohol based resin layer is immersed in an iodine aqueous solution using iodine as the dichroic material in the dyeing step, the iodine molecules ($I_2$) do not dissolve independently in water. Accordingly, the iodine is dissolved in water together with potassium iodide (KI) so as to prepare an iodine/potassium iodide aqueous solution. In the iodine/potassium iodide aqueous solution, polyiodine ions ($I_3^-$ and $I_5^-$) in which iodine ions and iodine molecules are combined are present in addition to potassium ions ($K^+$) and iodine ions ($I^-$). In the dyeing step, the iodine ions and the polyiodine ions penetrate into the polyvinyl alcohol based resin layer so as to be adsorbed to the molecules of polyvinyl alcohol based resin. In the subsequent stretching step, when the polyvinyl alcohol based resin layer is stretched and the molecules are oriented, the polyiodine ions are also oriented in the stretching direction. The oriented polyiodine ions have a different transmittance of incident light depending on the angle of the polarizing direction of incident light relative to the orientation direction of the polyiodine ions, so that the dyed and stretched polyvinyl alcohol based resin layer can function as polarizer.

As described above, the polarizing film includes at least a polyvinyl alcohol based resin and polyiodine ions. The polyiodine ions are present in a state having polyvinyl alcohol (PVA)-iodine complexes (PVA-$I_3^-$ and PVA-$I_5^-$) in a polarizer due to the interaction with polyvinyl alcohol based resin molecules. Due to the formation of the complex state, an absorption dichroism is exhibited in the wavelength range of visible light. Iodine ions ($I^-$) have a light absorption peak in the vicinity of 230 nm. The triiodide ions (PVA-$I_3^-$) in a complex state with polyvinyl alcohol have a light absorption peak in the vicinity of 470 nm. The pentaiodide (PVA-$I_5^-$) ions in a complex state with polyvinyl alcohol have a light absorption peak in the vicinity of 600 nm. Since the wavelength of the absorbed light changes depending on the aspect of the PVA-iodine complex, the light absorption peak of polyiodine ions encompasses a broad rage. The PVA-iodine complex absorbs visible light. In contrast, iodine ions have a peak in the vicinity of 230 nm, absorbing no visible light. Accordingly, the polyiodine ions in a complex state with polyvinyl alcohol have an effect on the performance of a polarizing film.

The polarizing film of the present invention has a thickness of preferably 10 μm or less, more preferably 7 μm or less, still more preferably 5 μm or less.

EXAMPLES

The laminate, the stretched laminate, the manufacturing method of stretched laminates, the manufacturing method of optical film laminates, and the polarizing film of the present invention are further described referring to the following Examples. The laminate, the stretched laminate, the manufacturing method of stretched laminates, the manufacturing method of optical film laminates, and the polarizing film of the present invention are not limited to the Examples, though.

Example 1

A long film (thickness: 100 μm) of isophthalic acid copolymerized polyethylene terephthalate (hereinafter referred to as "amorphous PET") having a water absorption of 0.60% and a glass transition temperature (Tg) of 80° C. was used as the thermoplastic resin substrate.

A single side of the amorphous PET substrate was corona treated. The corona treated surface was applied with a polyvinyl alcohol aqueous solution. The polyvinyl alcohol aqueous solution was prepared by using a polyvinyl alcohol resin including polyvinyl alcohol having a polymerization degree of 4200 and a saponification degree of 99.2 mol % and acetoacetyl modified polyvinyl alcohol (trade name "GOHSEFIMER Z200" (registered trade mark), manufactured by Nippon Synthetic Chemical Industry Co., Ltd. (average polymerization degree: 1200, saponification degree: 98.5 mol %, acetoacetyl degree: 5 mol %)) at a mix ratio of 9:1, and adding potassium iodide to have a molar ratio of the potassium iodide (molecular weight: 162) to the polyvinyl alcohol resin (average molecular weight: 44) of 1.4. The polyvinyl alcohol concentration in the polyvinyl alcohol aqueous solution was set at 4 wt %. The polyvinyl alcohol aqueous solution obtained was applied to an amorphous PET substrate, and dried at 60° C. A laminate including a polyvinyl alcohol based resin layer having a thickness of 12 μm was thus manufactured.

The laminate obtained was subjected to the following steps including a two-stage stretching step of auxiliary stretching in the air and stretching in boric acid water, so that a polarizing film having a thickness of 5 μm was manufactured.

First, the laminate thus obtained was subjected to free end uniaxial stretching by 1.8-fold, in the vertical direction (longitudinal direction) between rolls having a different circumferential speed in an oven at 120° C., so that a stretched laminate including an amorphous PET substrate and a stretched polyvinyl alcohol based resin layer was obtained (in-air auxiliary stretching step). Through the auxiliary stretching treatment in the air, the polyvinyl alcohol based resin layer changed into a polyvinyl alcohol based resin layer with polyvinyl alcohol molecules oriented.

Subsequently, the stretched laminate thus obtained was immersed in an insolubilizing bath at a liquid temperature of 30° C. (boric acid aqueous solution obtained by adding 4 parts by weight of boric acid to 100 parts by weight of water) for 30 seconds (first insolubilizing step).

Subsequently, the stretched laminate through the first insolubilizing treatment was immersed in a dyeing bath at a liquid temperature of 30° C. (an iodine aqueous solution including iodine and potassium iodide in 100 parts by weight of water at a weight ratio of 1:7), in which the iodide concentration was adjusted such that the transmittance of the polarizing plate had an optional value, for 60 seconds, so that a colored laminate including a stretched polyvinyl alcohol based resin layer with polyiodine ions adsorbed thereto was formed (dyeing step).

Subsequently, the colored laminate thus obtained was immersed in a cross-linking bath (a boric acid aqueous solution obtained by adding 3 parts by weight of potassium iodide and 3 parts by weight of boric acid to 100 parts by weight of water) at a liquid temperature of 30° C. for 30 seconds (cross-linking step).

Subsequently, the colored laminate through the cross-linking treatment was immersed in a boric acid aqueous solution (an aqueous solution obtained by adding 4 parts by weight of boric acid and 5 parts by weight of potassium iodide to 100 parts by weight of water) having a liquid temperature of 70° C., and subjected to uniaxial stretching in the vertical direction (longitudinal direction) between rolls having a different circumferential speed in parallel, so as to obtain a stretch ratio of 6.0 in the total of auxiliary stretching in the air and stretching in boric acid water. Consequently an optical film laminate was thus obtained (in-boric acid water stretching step). Through the stretching treatment in boric acid water, the vinyl alcohol based resin layer included in a colored laminate changed into a vinyl alcohol based resin layer with adsorbed polyiodine ions oriented, having a thickness of 5 μm. The vinyl alcohol based resin layer with adsorbed polyiodine ions oriented constitutes a polarizing film of an optical film laminate.

Subsequently, the optical film laminate thus obtained was immersed in a cleaning bath (an aqueous solution obtained by adding 4 parts by weight of potassium iodide to 100 parts by weight of water) having a liquid temperature of 30° C. (cleaning step).

Subsequently, the optical film laminate through the cleaning step was dried with hot air at 60° C. (drying step). The polarizing film included in the optical film laminate thus obtained had a thickness of 5 μm.

Subsequently, the surface of the polyvinyl alcohol based resin layer of the optical film laminate thus obtained was applied with a polyvinyl alcohol based resin aqueous solution (trade name "GOHSEFIMER Z200", manufactured by Nippon Synthetic Chemical Industry Co., Ltd., resin concentration: 3 wt %), and a triacetyl cellulose film (trade name "KC4UY", manufactured by Konica Minolta, Inc., thickness: 40 μm) was laminated thereto. The laminate was heated in an oven held at 60° C. for 5 minutes, and the amorphous PET substrate was then detached. The polarizing film was transferred to the triacetyl cellulose film, so that an optical laminate (polarizing plate) was manufactured.

In the present Example, the amount of iodine adsorbed was adjusted by changing the iodine concentration of the iodine aqueous solution in the dyeing step, such that the finally formed polarizing film had a single layer transmittance of 40 to 44%. Consequently optical film laminates including various polarizing films having a different single layer transmittance and a different degree of polarization.

Figure 1:
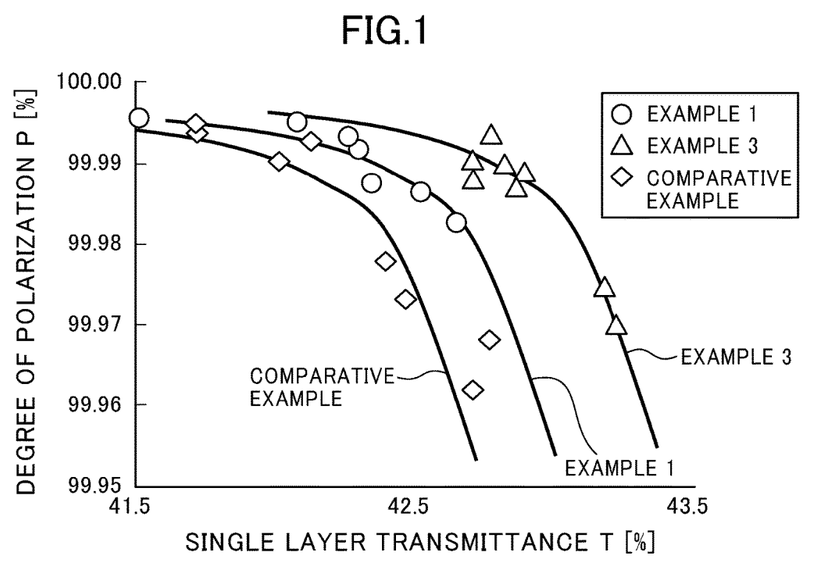
FIG. 1 is a chart showing the optical properties (relation between single layer transmittance T and degree of polarization P) of polarizing films manufactured in Examples and Comparative Example, respectively, with the (stretched) polyvinyl alcohol based resin layer containing potassium iodide.

The polarizing film (optical laminate) and the stretched laminate thus obtained were subjected to various evaluations as follows. The properties of the polarizing films thus obtained are shown in FIG. 1, and the properties of a polarizing film having a degree of polarization P of 99.99% estimated from the graph in FIG. 1 and the properties of a stretched laminate thus obtained are shown in Table 1.

Example 2

A polarizing film (optical laminate) was manufactured under the same conditions as in Example 1, except that the molar ratio of potassium iodide to the polyvinyl alcohol resin in the polyvinyl alcohol aqueous solution to be applied to an amorphous PET substrate was 2.7 and an optical film laminate including a polarizing film having a degree of polarization of 99.99% only was formed, and subjected to various evaluations as follows.

The properties of the polarizing film and the stretched laminate thus obtained are shown in Table 1.

Example 3

Polarizing films (optical laminates) were manufactured under the same conditions as in Example 1, except that the molar ratio of potassium iodide to the polyvinyl alcohol resin in the polyvinyl alcohol aqueous solution to be applied to an amorphous PET substrate was 4.1, and subjected to various evaluations as follows.

The properties of the polarizing films thus obtained are shown in FIG. 1, and the properties of a polarizing film having a degree of polarization P of 99.99% estimated from the graph in FIG. 1 and the properties of a stretched laminate thus obtained are shown in Table 1.

Example 4

A stretched laminate was manufactured under the same conditions as in Example 1, except that the molar ratio of potassium iodide to the polyvinyl alcohol resin in the polyvinyl alcohol aqueous solution to be applied to an amorphous PET substrate was 4.9, and subjected to the evaluation on film opacity (bleeding out) as follows.

The properties of the stretched laminate thus obtained are shown in Table 1.

Example 5

A stretched laminate was manufactured under the same conditions as in Example 1, except that the molar ratio of potassium iodide to the polyvinyl alcohol resin in the polyvinyl alcohol aqueous solution to be applied to an amorphous PET substrate was 5.2, and subjected to the evaluation on film opacity (bleeding out) as follows.

The properties of the stretched laminate thus obtained are shown in Table 1.

Example 6

A stretched laminate was manufactured under the same conditions as in Example 1, except that the molar ratio of potassium iodide to the polyvinyl alcohol resin in the polyvinyl alcohol aqueous solution to be applied to an amorphous PET substrate was 5.4, and subjected to the evaluation on film opacity (bleeding out) as follows.

The properties of the stretched laminate thus obtained are shown in Table 1.

Example 7

A stretched laminate was manufactured under the same conditions as in Example 1, except that the molar ratio of potassium iodide to the polyvinyl alcohol resin in the polyvinyl alcohol aqueous solution to be applied to an amorphous PET substrate was 6.0, and subjected to the evaluation on film opacity (bleeding out) as follows.

The properties of the stretched laminate thus obtained are shown in Table 1.

Example 8

Polarizing films and optical laminates were manufactured and prepared under the same conditions as in Example 1, except that the halide added to the polyvinyl alcohol aqueous solution to be applied to an amorphous PET substrate was sodium chloride and the molar ratio of sodium chloride to the polyvinyl alcohol resin in the polyvinyl alcohol aqueous solution to be applied to an amorphous PET substrate was 3.8, and subjected to various evaluations as follows.

Figure 2:
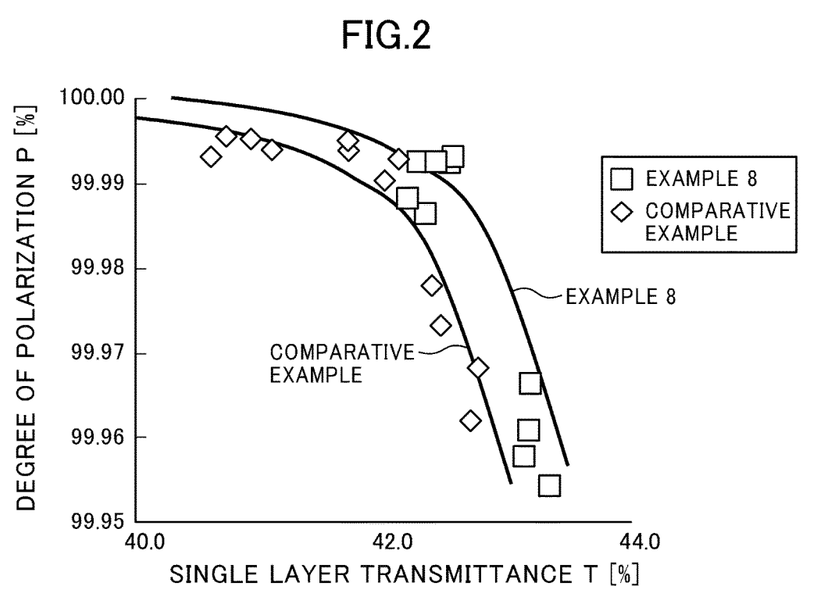
FIG. 2 is a chart showing the optical properties (relation between single layer transmittance T and degree of polarization P) of polarizing films manufactured in Examples and Comparative Example, respectively, with the (stretched) polyvinyl alcohol based resin layer containing sodium chloride.

The properties of the polarizing films thus obtained are shown in FIG. 2, and the properties of a polarizing film having a degree of polarization P of 99.99% estimated from the graph in FIG. 2 and the properties of a stretched laminate thus obtained are shown in Table 1.

Example 9

A stretched laminate was manufactured under the same conditions as in Example 8, except that the molar ratio of sodium chloride to the polyvinyl alcohol resin in the polyvinyl alcohol aqueous solution to be applied to an amorphous PET substrate was 4.6, and subjected to the evaluation on film opacity (bleeding out) as follows.

The properties of the stretched laminate thus obtained are shown in Table 1.

Example 10

A stretched laminate was manufactured under the same conditions as in Example 8, except that the molar ratio of sodium chloride to the polyvinyl alcohol resin in the polyvinyl alcohol aqueous solution to be applied to an amorphous PET substrate was 5.3, and subjected to the evaluation on film opacity (bleeding out) as follows.

The properties of the stretched laminate thus obtained are shown in Table 1.

Example 11

A stretched laminate was manufactured under the same conditions as in Example 8, except that the molar ratio of sodium chloride to the polyvinyl alcohol resin in the polyvinyl alcohol aqueous solution to be applied to an amorphous PET substrate was 6.1, and subjected to the evaluation on film opacity (bleeding out) as follows.

The properties of the stretched laminate thus obtained are shown in Table 1.

Example 12

A stretched laminate was manufactured under the same conditions as in Example 8, except that the molar ratio of sodium chloride to the polyvinyl alcohol resin in the polyvinyl alcohol aqueous solution to be applied to an amorphous PET substrate was 6.8, and subjected to the evaluation on film opacity (bleeding out) as follows.

The properties of the stretched laminate thus obtained are shown in Table 1.

Example 13

A stretched laminate was manufactured under the same conditions as in Example 8, except that the molar ratio of sodium chloride to the polyvinyl alcohol resin in the polyvinyl alcohol aqueous solution to be applied to an amorphous PET substrate was 7.6, and subjected to the evaluation on film opacity (bleeding out) as follows.

The properties of the stretched laminate thus obtained are shown in Table 1.

Example 14

A stretched laminate was manufactured under the same conditions as in Example 8, except that the molar ratio of sodium chloride to the polyvinyl alcohol resin in the polyvinyl alcohol aqueous solution to be applied to an amorphous PET substrate was 19, and subjected to the evaluation on film opacity (bleeding out) as follows.

The properties of the stretched laminate thus obtained are shown in Table 1.

Comparative Example

Polarizing films (optical laminates) were manufactured under the same conditions as in Example 1, except that no halide (potassium iodide or sodium chloride) was added to the polyvinyl alcohol aqueous solution to be applied to an amorphous PET substrate, and subjected to various evaluations as follows.

The properties of the polarizing films thus obtained are shown in FIG. 1 and FIG. 2, and the properties of a polarizing film having a degree of polarization P of 99.99% estimated from the graph in FIG. 1 and the properties of a stretched laminate thus obtained are shown in Table 1.

TABLE 1

|  | Additive | Amount added [molar ratio] | Single layer transmittance [%] (Degree of Polarization P = 99.99%) | Film opacity (bleeding out) |
|---|---|---|---|---|
| Example 1 | KI | 1.4 | 42.3 | No opacity was visually observed. |
| Example 2 | KI | 2.7 | 42.5 | No opacity was visually observed. |
| Example 3 | KI | 4.1 | 42.9 | No opacity was visually observed. |
| Example 4 | KI | 4.9 | — | No opacity was visually observed. |
| Example 5 | KI | 5.2 | — | No opacity was visually observed. |
| Example 6 | KI | 5.4 | — | Opacity was visually observed in some cases. |
| Example 7 | KI | 6.0 | — | Opacity was visually observed. |
| Example 8 | NaCl | 3.8 | 42.5 | No opacity was visually observed. |
| Example 9 | NaCl | 4.6 | — | No opacity was visually observed. |
| Example 10 | NaCl | 5.3 | — | No opacity was visually observed. |
| Example 11 | NaCl | 6.1 | — | Opacity was visually observed in some cases. |
| Example 12 | NaCl | 6.8 | — | Opacity was visually observed. |
| Example 13 | NaCl | 7.6 | — | Opacity was visually observed. |
| Example 14 | NaCl | 19.0 | — | Opacity was visually observed. |
| Comparative Example | None | 0 | 42.0 | No opacity was visually observed. |

[Evaluation]

(Method for Measuring Thickness)

The thickness of amorphous PET substrates and polyvinyl alcohol resin layer was measured with a digital micrometer (KC-351C, manufactured by Anritsu Corporation).

(Method for Measuring Transmittance and Degree of Polarization)

The single layer transmittance T, the parallel transmittance Tp, and the crossed transmittance Tc of the polarizing film of optical laminates obtained in Examples and Comparative Example were measured with a UV-visible light spectrophotometer (V7100, manufactured by JASCO Corporation). These T, Tp and Tc are Y values measured in the 2-degree visual field (illuminant C) in accordance with JIS Z 8701 and corrected for the relative spectral responsivity.

The degree of polarization P was obtained from the following formula, using the transmittances described above.

$$\text{Degree of polarization } P\ (\%) = \{(Tp-Tc)/(Tp+Tc)\}^{1/2} \times 100$$

In the case of a substrate having functions producing an effect on the transmitting properties such as reflection, light scattering, and color hue adjustment, only the polyvinyl alcohol based resin layer containing a dichroic material such as iodine was measured.

(Evaluation on Optical Properties)

Referring to FIGS. 1 and 2, and Table 1, it was found that the polarizing film obtained by adding a halide (potassium iodide or sodium chloride) to the polyvinyl alcohol aqueous solution to be applied to an amorphous PET substrate, in an amount to have a molar ratio of the halide to the polyvinyl alcohol based resin contained in the polyvinyl alcohol based resin of 1.0 or more, had more improved optical properties (relations between the single layer transmittance T and the degree of polarization P) in comparison with a polarizing film obtained without addition of the halide, and the optical properties of the polarizing film were further improved as the amount of the halide added increased.

(Evaluation on Film Opacity (Bleeding Out of Halide))

As described above, as the amount of halide added to the polyvinyl alcohol aqueous solution to be applied to an amorphous PET substrate increased, the halide bled out to opacify a film. Accordingly, the opacity of stretched laminates through the in-air auxiliary stretching step was evaluated by visual observation. The results are shown in Table 1. Referring to Table 1, it was found that the opacity of the film was visually observed in some cases when the molar ratio of the halide to the polyvinyl alcohol based resin contained in the polyvinyl alcohol based resin was 5.4, and the halide bled out to opacify the film when the molar ratio of the halide to the polyvinyl alcohol based resin contained in the polyvinyl alcohol based resin was more than 5.3.

Although specific embodiments of the present invention were described above referring to drawings, various alterations may be made besides the configurations shown in the drawings. Accordingly, the present invention is not limited to the configurations described referring to drawings, and the scope of the present invention should be determined only by the scope of the claims attached and the scope equivalent thereto.

The invention claimed is:

1. A laminate comprising a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material, the post-process being performed after the polyvinyl alcohol based resin layer formed on the thermoplastic resin substrate is stretched together with the thermoplastic resin substrate, wherein the polyvinyl alcohol based resin layer comprises a polyvinyl alcohol based resin and a halide, and the molar ratio of the halide to the polyvinyl alcohol based resin is 1.0 or more and 5.3 or less.

2. The laminate according to claim 1, wherein the post-process further comprises a final stretching step of stretching the polyvinyl alcohol based resin layer.

3. The laminate according to claim 1, wherein the halide is an iodide.

4. The laminate according to claim 3, wherein the iodide is potassium iodide.

5. The laminate according to claim 1, wherein the halide is sodium chloride.

6. The laminate according to claim 1, wherein the polyvinyl alcohol resin layer formed on the thermoplastic resin substrate prior to stretching is obtained by applying a polyvinyl alcohol based resin coating liquid containing the halide to the thermoplastic resin substrate and then drying at 80° C. or lower.

7. A stretched laminate comprising a thermoplastic resin substrate and a polyvinyl alcohol based resin layer formed on the thermoplastic resin substrate, being used to form a polarizing film of the polyvinyl alcohol based resin layer treated with a post-process comprising at least a dyeing step of dyeing the polyvinyl alcohol based resin layer with a dichroic material, wherein
the polyvinyl alcohol based resin layer comprises a polyvinyl alcohol based resin and a halide,
the molar ratio of the halide to the polyvinyl alcohol based resin is 1.0 or more and 5.3 or less, and
the polyvinyl alcohol based resin layer formed on the thermoplastic resin substrate is stretched together with the thermoplastic resin substrate.

8. The stretched laminate according to claim 7, wherein the post-process further comprises a final stretching step of stretching the polyvinyl alcohol based resin layer.

9. The stretched laminate according to claim 7, wherein the halide is an iodide.

10. The stretched laminate according to claim 9, wherein the iodide is potassium iodide.

11. The stretched laminate according to claim 7, wherein the halide is sodium chloride.

12. The stretched laminate according to claim 7, wherein the polyvinyl alcohol resin layer formed on the thermoplastic resin substrate prior to stretching is obtained by applying a polyvinyl alcohol based resin coating liquid containing the halide to the thermoplastic resin substrate and then drying at 80° C. or lower.

13. The stretched laminate according to claim 7, wherein the polyvinyl alcohol based resin layer formed on the thermoplastic resin substrate is stretched in the air together with the thermoplastic resin substrate.

14. The stretched laminate according to claim 13, wherein the stretch ratio in the stretching in the air is 1.5 or more and 3.5 or less.

15. The stretched laminate according to claim 14, wherein the stretching temperature in the stretching in the air is 100° C. or higher and 150° C. or lower.

16. The stretched laminate according to claim 7, wherein the post-process comprises at least
a dyeing step of dyeing the polyvinyl alcohol based resin layer with a dichroic material to form a colored laminate, and
an in-boric acid water stretching step of stretching the colored laminate in a boric acid aqueous solution.

17. The stretched laminate according to claim 7, wherein the polarizing film has a thickness of 10 μm or less.

18. The stretched laminate according to claim 7, wherein the polarizing film has a thickness of 7 μm or less.

19. The stretched laminate according to claim 7, wherein the polarizing film has a thickness of 5 μm or less.

20. A roll of stretched laminate formed by winding the stretched laminate according to claim 7, in a roll form.

21. A manufacturing method of a stretched laminate including a thermoplastic resin substrate and a polyvinyl alcohol based resin layer formed on a thermoplastic resin substrate, being used to form a polarizing film of the polyvinyl alcohol based resin layer treated with a post-process including at least a dyeing step of dyeing the polyvinyl alcohol based resin layer with a dichroic material, comprising the steps of:
applying a polyvinyl alcohol based resin coating liquid containing a halide to the thermoplastic resin substrate so as to form a laminate including the thermoplastic resin substrate and a polyvinyl alcohol based resin layer containing a polyvinyl alcohol based resin and a halide, formed on the thermoplastic resin substrate; and
stretching the laminate to form a stretched laminate,
wherein the molar ratio of the halide to the polyvinyl alcohol based resin contained in the polyvinyl alcohol based resin layer included in the laminate is 1.0 or more and 5.3 or less.

22. The manufacturing method of a stretched laminate according to claim 21, wherein the post-process further comprises a final stretching step of stretching the polyvinyl alcohol based resin layer.

23. The manufacturing method of a stretched laminate according to claim 21, wherein the halide is an iodide.

24. The manufacturing method of a stretched laminate according to claim 23, wherein the iodide is potassium iodide.

25. The manufacturing method of a stretched laminate according to claim 21, wherein the halide is sodium chloride.

26. The manufacturing method of a stretched laminate according to claim 21, wherein the step of forming the laminate further comprises a step of drying at 80° C. or lower, after application of the polyvinyl alcohol based resin coating liquid containing a halide.

27. The manufacturing method of a stretched laminate according to claim 21, wherein the laminate is stretched in the air.

28. The manufacturing method of a stretched laminate according to claim 27, wherein the stretch ratio in the stretching in the air is 1.5 or more and 3.5 or less.

29. The manufacturing method of a stretched laminate according to claim 28, wherein the stretching temperature in the stretching in the air is 100° C. or higher and 150° C. or lower.

30. A manufacturing method of a roll of stretched laminate comprising winding, in a roll form, a stretched laminate manufactured by the manufacturing method of a stretched laminate according to claim 21 so as to form a roll of stretched laminate.

31. A manufacturing method of an optical film laminate comprising:
a step of stretching a laminate including a thermoplastic resin substrate and a polyvinyl alcohol based resin layer containing a polyvinyl alcohol based resin and a halide, formed on the thermoplastic resin substrate, so as to form a stretched laminate including the thermoplastic resin substrate and the stretched polyvinyl alcohol based resin layer; and
a post-process including at least a dyeing step of dyeing the polyvinyl alcohol based resin layer with a dichroic material;
the optical film laminate including a polarizing film formed of the polyvinyl alcohol based resin layer treated with the post-process and the thermoplastic resin substrate,
wherein the molar ratio of the halide to the polyvinyl alcohol based resin contained in the polyvinyl alcohol based resin layer included in the laminate is 1.0 or more and 5.3 or less.

32. The manufacturing method of an optical film laminate according to claim 31, wherein the post-process further comprises a final stretching step of stretching the polyvinyl alcohol based resin layer.

33. The manufacturing method of an optical film laminate according to claim 31, wherein the halide is an iodide.

34. The manufacturing method of an optical film laminate according to claim 33, wherein the iodide is potassium iodide.

35. The manufacturing method of an optical film laminate according to claim 31, wherein the halide is sodium chloride.

36. The manufacturing method of an optical film laminate according to claim 31, wherein the polyvinyl alcohol resin layer formed on the thermoplastic resin substrate prior to stretching is obtained by applying a polyvinyl alcohol based resin coating liquid containing the halide to the thermoplastic resin substrate and then drying at 80° C. or lower.

37. The manufacturing method of an optical film laminate according to claim 31, wherein the laminate is stretched in the air.

38. The manufacturing method of an optical film laminate according to claim 37, wherein the stretch ratio in the stretching in the air is 1.5 or more and 3.5 or less.

39. The manufacturing method of an optical film laminate according to claim 38, wherein the stretching temperature in the stretching in the air is 100° C. or higher and 150° C. or lower.

40. The manufacturing method of an optical film laminate according to claim 31, wherein the post-process comprises at least:
- a dyeing step of dyeing the polyvinyl alcohol based resin layer with a dichroic material to form a colored laminate; and
- an in-boric acid water stretching step of stretching the colored laminate in a boric acid aqueous solution.

41. The manufacturing method of an optical film laminate according to claim 31, wherein the polarizing film has a thickness of 10 μm or less.

42. The manufacturing method of an optical film laminate according to claim 31, wherein the polarizing film has a thickness of 7 μm or less.

43. The manufacturing method of an optical film laminate according to claim 31, wherein the polarizing film has a thickness of 5 μm or less.

44. A polarizing film manufactured by the manufacturing method of an optical film laminate according to claim 31.

* * * * *